United States Patent [19]

Himmelstein

[11] Patent Number: 4,563,905
[45] Date of Patent: Jan. 14, 1986

[54] SHAFT TORQUEMETER

[75] Inventor: Sydney Himmelstein, Barrington Hills, Ill.

[73] Assignee: S. Himmelstein and Company, Hoffman Estates, Ill.

[21] Appl. No.: 644,877

[22] Filed: Aug. 27, 1984

[51] Int. Cl.[4] ............................................. G01L 3/10
[52] U.S. Cl. .................................. 73/862.36; 324/209
[58] Field of Search ........................... 73/862.36, 779; 324/209; 336/20

[56] References Cited

U.S. PATENT DOCUMENTS

| Re. 26,501 | 12/1968 | Himmelstein et al. |
|---|---|---|
| Re. 28,899 | 7/1976 | Himmelstein et al. |
| 2,511,178 | 6/1950 | Roters ............................ 78/862.36 |
| 3,013,205 | 12/1961 | Dubsky et al. .............. 73/862.36 X |
| 3,441,886 | 4/1969 | Tveter . |
| 3,501,950 | 3/1970 | Hohenberg ................... 73/862.36 |
| 3,531,748 | 9/1970 | Tveter et al. |
| 3,531,749 | 9/1970 | Tveter et al. |
| 3,717,029 | 2/1973 | Tveter . |
| 3,800,591 | 4/1974 | Tveter . |
| 3,827,506 | 8/1974 | Himmelstein et al. |
| 3,961,525 | 6/1976 | Himmelstein . |
| 4,142,591 | 3/1979 | Himmelstein . |
| 4,320,463 | 3/1982 | Himmelstein . |
| 4,381,684 | 5/1983 | Himmelstein . |
| 4,412,198 | 10/1983 | Reich . |
| 4,479,390 | 10/1984 | Meixner ........................... 73/862.36 |

FOREIGN PATENT DOCUMENTS

| 192836 | 11/1982 | Japan ............................... 73/862.36 |
|---|---|---|
| 442441 | 2/1936 | United Kingdom ............. 73/862.36 |
| 762963 | 12/1956 | United Kingdom ............. 73/862.36 |
| 597932 | 3/1978 | U.S.S.R. ......................... 73/862.36 |
| 657281 | 4/1979 | U.S.S.R. ......................... 73/862.36 |

Primary Examiner—Charles A. Ruehl
Attorney, Agent, or Firm—Wood, Dalton, Phillips, Mason & Rowe

[57] ABSTRACT

A nonintrusive torquemeter for measuring torque in a shaft having variable reluctance as a result of torque stresses developed in the shaft. The torquemeter includes an annular first coil disposed axially about the shaft, a second coil wound about the first coil coaxially of the annular axis of the first coil to be in space quadrature therewith, structure for mounting the coil assembly coaxially about the shaft to include the shaft in the magnetic flux coupling path between the coils, and structure for providing a signal corresponding to the voltage developed in the pickup winding as a result of changes in the magnetic reluctance of the shaft resulting from torque developed therein. One of the coils is electrically excited to define an excitation winding, and the other of the coils serves as a pickup winding, with the coils being effectively uncoupled in the absence of torque in the shaft and being variably coupled as an incident of torque being developed in the shaft causing a corresponding change in the reluctance thereof.

8 Claims, 3 Drawing Figures

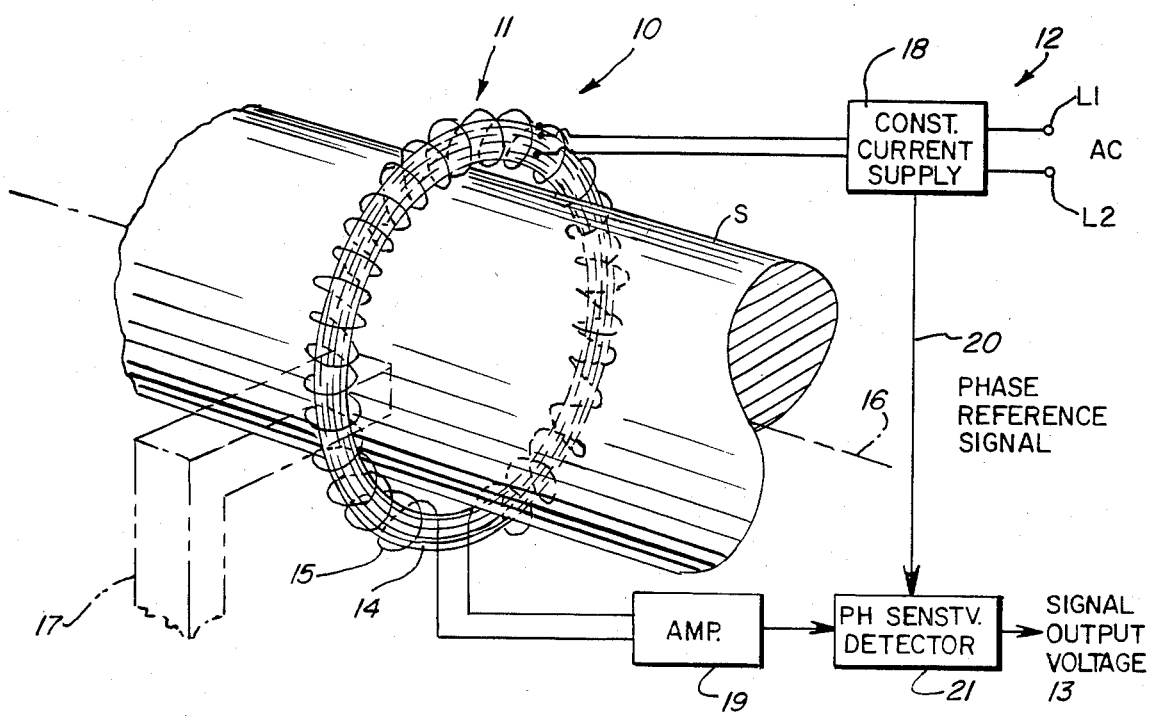
FIG. 1
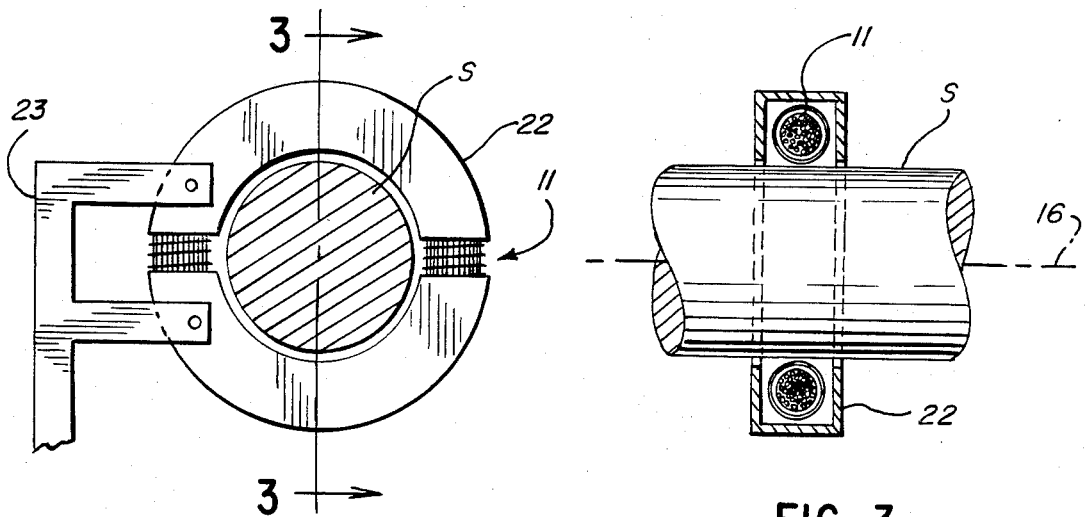
FIG. 2
FIG. 3

SHAFT TORQUEMETER

TECHNICAL FIELD

This invention relates to torquemeters and in particular to shaft torquemeters.

BACKGROUND ART

A number of different forms of torquemeters have been developed for indicating the torque being transmitted through a shaft. One conventional form of such a torquemeter utilizes a strain gage mounted to the shaft. Such torquemeters provide excellent means for indicating such torque transmission and have found widespread commercial use.

In some applications, however, it is desirable to avoid any change in the mechanical characteristics of the load-bearing shaft network. One such application is in turbo machines and the like, wherein the shaft characteristics are accurately designed to optimize the shaft dynamics for efficient operation at the conventional high speeds at which such equipment is operated.

Additionally, nonintrusive torquemeters are advantageously applied in other forms of machinery wherein it is desirable to avoid repositioning of the drive elements or affect the shaft balance, shaft overload capacity, and/or shaft stiffness.

Such nonintrusive shaft torquemeters commonly are arranged to utilize the magnetic anisotropy induced in the shaft by shear stresses resulting from the applied torque.

The presently available nonintrusive shaft torquemeters of this type have the serious disadvantage of limited measurement accuracy because of spurious signals developed for a number of reasons. Such spurious signals are generated by residual magnetic nonuniformity within the shaft, the effects of mechanical vibration of the shaft, and the effects of shaft runout and associated air gap variations. Another problem which has arisen in a number of the prior art structures is the residual variations in output resulting from variations in the shaft position defining the zero point. Such variations in the zero point positioning cause significant measurement uncertainties.

Another serious problem of the known nonintrusive shaft torquemeters is the adverse effect on accuracy caused by axial and radial shaft temperature gradients. Such temperature gradients commonly exist in shaft systems wherein power consuming and power producing devices are located at different points along the shaft.

The use of spaced windings and associated magnetic structures around the circumference of the shaft has been one attempted solution but has been found not to completely integrate out the signal variations caused by the above discussed anomalies and bending of the shaft in use.

DISCLOSURE OF INVENTION

The present invention comprehends an improved torquemeter structure which eliminates the disadvantages of the prior art nonintrusive torquemeter structures in a novel and simple manner.

More specifically, the invention comprehends the provision of a nonintrusive torquemeter for measuring torque in a shaft having variable reluctance as a result of torque stresses developed therein, including an annular first coil constructed to be disposed coaxially about the shaft, a second coil wound about the first coil coaxially of the annular axis of the first coil to be in space quadrature with the first coil, means for mounting the coils coaxially about the shaft to include the shaft in the magnetic flux coupling path between the coils, means for electrically exciting one of the coils to cause that coil to comprise an excitation winding and the other of the coils to comprise a pickup winding, the coils being effectively uncoupled in the absence of torque in the shaft and being variably coupled as an incident of torque being developed in the shaft causing a corresponding change in the reluctance of the shaft, and means for providing a signal corresponding to a voltage developed in the pickup winding coil as a result of a change in the magnetic reluctance of the shaft resulting from torque developed in the shaft.

The invention further comprehends the provision in such a nonintrusive torquemeter of an annular magnetic core structure extending about the coils and defining with the shaft a low reluctance magnetic path.

Further, the invention comprehends the provision of such a nonintrusive torquemeter structure further including shielding means extending about the coils for shielding the coils from external magnetic fields.

In the illustrated embodiment, the signal providing means includes a voltage amplifier.

In the illustrated embodiment, the signal providing means includes a phase sensitive detector for comparing the phase of the signal with that of the excitation winding.

In the illustrated embodiment, the electrically exciting means comprises means for providing a constant alternating current electrical supply.

The core structure and shielding means may comprise split annular structures.

The torquemeter of the present invention is extremely simple and economical of construction while yet providing the highly desirable improved accuracy and long life.

BRIEF DESCRIPTION OF THE DRAWING

Other features and advantages of the invention will be apparent from the following description taken in connection with the accompanying drawing wherein:

FIG. 1 is a schematic perspective view illustrating the torquemeter system of the present invention;

FIG. 2 is a transverse section illustrating the use of a split core structure in association with the torquemeter coil means; and FIG. 3 is a transverse section taken substantially along the line 3—3 of FIG. 2.

BEST MODE FOR CARRYING OUT THE INVENTION

In the illustrative embodiment of the invention as disclosed in the drawing, a torquemeter generally designated 10 is provided for measuring torque developed in a shaft S. The torquemeter includes a coil structure generally designated 11 extending annularly coaxially about the shaft S and associated control circuitry generally designated 12 for providing an output signal 13 corresponding to the torque developed in the shaft.

As illustrated in FIG. 1, coil structure 11 includes a first coil 14 which extends helically coaxially about the shaft and effectively forming a figure of revolution thereabout.

Coil structure 11 further includes a second coil 15 wound helically about the axis of first coil 14 so as to effectively form a second figure of revolution extending coaxially about the axis 16 of shaft S. As shown, the flux field of coils 14 and 15 are in space quadrature so that there is no coupling between them when there is no shear stress developed in shaft S as a result of torque developed therein.

The coil structure 11 further includes bracket means 17 for accurately disposing the coil structure coaxially of shaft axis 16.

As further illustrated in FIG. 1, first coil 14 is excited by a constant current alternating current power supply 18 illustratively connected to power supply leads L1 and L2 of a conventional 60 Hz. 120-volt power system. As so connected, coil 14 defines a primary, or excitation, winding. Coil 15 effectively comprises a secondary, or pickup, winding, and is connected to a suitable amplifier 19 for providing the desired output signal.

As further shown in FIG. 1, a phase reference signal may be provided by means of connection 20 from the constant current supply 18 to a phase sensitive detector 21 connected to the output of amplifier 19.

The excitation supply 18 preferably provides an excitation signal to the coil 14 in the range of 1 to 5 kHz. Such a frequency range causes the excitation field to extend only into the other surface portion of the shaft as a result of skin effects. This is highly desirable in that the mechanical stress signals are at a maximum adjacent the outer surface. Thus, magnetic saturation of the shaft surface portion is easily effected so as to eliminate hysteresis from the system. Additionally, the use of coil structure 11 effectively fully cancels spurious signals resulting from shaft bending moments, thereby providing further improved accuracy in the output torque signal.

To assure the magnetic field saturation of the surface portion of the shaft, a split annular core structure 22 is provided. As shown, the core may be supported by a suitable bracket 23 so as to define a stationary, nonrotating core structure which not only increases the efficiency of the magnetic circuit to provide the desired saturation of the shaft material, but also defines means for shielding the coil structure from ambient magnetic fields. As will be obvious to those skilled in the art, the core structure may comprise any suitable magnetic core structure. Thus, the core structure may be machined or molded from ferrite pieces, or formed from laminations. When the core structure is utilized, the first core 14 is preferably utilized as the excitation coil, as illustrated in FIG. 1. In the absence of use of such core structures, either of the coils may comprise the excitation coil, as will be obvious to those skilled in the art.

Thus, the invention broadly comprehends provision of means for electrically exciting one of the coils to cause that coil to comprise an excitation winding, and the other of the coils to comprise a pickup winding. The coils are effectively uncoupled in the absence of torque in the shaft and are variably coupled as an incident of torque being developed in the shaft causing a corresponding change in the reluctance of the shaft. As discussed above, the variable reluctance portion of the shaft is effectively limited to the outer surface portion thereof so as to provide improved accuracy in the torque determination.

INDUSTRIAL APPLICABILITY

The improved torquemeter structure of the present invention provides a high degree of accuracy not heretofore provided in the nonintrusive magnetic torquemeters of the prior art. Thus, the torquemeter structure is advantageously adapted for use where it is desired to make torque determinations without affecting the shaft dynamics. As discussed above, such use is particularly advantageous where the drive system is operating at high speed, such as in turbine operation.

By avoiding the need for repositioning of the driver or driven means of the drive system and other rotating elements thereof, the torquemeter of the present invention is also advantageously adapted for use in low speed applications.

Thus, the torquemeter of the present invention is capable of wide industrial applicability.

I claim:

1. A torquemeter for measuring torque in a shaft having variable reluctance as a result of torque stresses developed therein, said torquemeter comprising:
    an annular first coil constructed to be disposed coaxially about the shaft;
    a second coil wound about the first coil coaxially of the annular axis of the first coil to be in space quadrature with said first coil;
    means for mounting said coils coaxially about the shaft to include the shaft in the magnetic flux coupling path between said coils;
    means for electrically exciting one of said coils to cause said one of said coils to comprise an excitation winding and the other of said coils to comprise a pickup winding, said coils being effectively uncoupled in the absence of torque in the shaft and being variably coupled as an incident of torque being developed in the shaft causing a corresponding change in the reluctance of the shaft; and
    means for providing a signal corresponding to a voltage developed in the pickup winding coil as a result of a change in the magnetic reluctance of the shaft resulting from torque developed in the shaft.

2. A torquemeter for measuring torque in a shaft having variable reluctance as a result of torque stresses developed therein, said torquemeter comprising:
    an annular first coil constructed to be disposed coaxially about the shaft;
    a second coil wound about the first coil coaxially of the annular axis of the first coil to be in space quadrature with said first coil;
    means for mounting said coils coaxially about the shaft to include the shaft in the magnetic flux coupling path between said coils;
    means for electrically exciting one of said coils to cause said one of said coils to comprise an excitation winding and the other of said coils to comprise a pickup winding, said coils being effectively uncoupled in the absence of torque in the shaft and being variably coupled as an incident of torque being developed in the shaft causing a corresponding change in the reluctance of the shaft;
    means for providing a signal corresponding to a voltage developed in the pickup winding coil as a result of a change in the magnetic reluctance of the shaft resulting from torque developed in the shaft; and
    an annular magnetic core structure extending about said coils and defining with said shaft a low reluctance magnetic path.

3. A torquemeter for measuring torque in a shaft having variable reluctance as a result of torque stresses developed therein, said torquemeter comprising:
- an annular first coil constructed to be disposed coaxially about the shaft;
- a second coil wound about the first coil coaxially of the annular axis of the first coil to be in space quadrature with said first coil;
- means for mounting said coils coaxially about the shaft to include the shaft in the magnetic flux coupling path between said coils;
- means for electrically exciting one of said coils to cause said one of said coils to comprise an excitation winding and the other of said coils to comprise a pickup winding, said coils being effectively uncoupled in the absence of torque in the shaft and being variably coupled as an incident of torque being developed in the shaft causing a corresponding change in the reluctance of the shaft;
- means for providing a signal corresponding to a voltage developed in the pickup winding coil as a result of a change in the magnetic reluctance of the shaft resulting from torque developed in the shaft; and
- shielding means extending about said coils for shielding the coils from external magnetic fields.

4. The torquemeter of claim 1, 2, or 3 wherein said means for providing a signal includes a voltage amplifier.

5. The torquemeter of claim 1, 2, or 3 wherein said electrically extending means comprises means for providing a constant alternating current electrical supply.

6. The torquemeter of claim 1, 2, or 3 wherein said means for providing a signal includes a phase detector for comparing the phases of said signal with that of the excitation winding.

7. The torquemeter of claim 2 wherein said core structure comprises a split annular structure.

8. The torquemeter of claim 3 wherein said shielding means comprises a split annular structure.

* * * * *